(12) United States Patent
Das et al.

(10) Patent No.: US 9,070,936 B2
(45) Date of Patent: Jun. 30, 2015

(54) THERMAL ELECTROCHEMICAL CELL

(75) Inventors: Sukhen Das, Kolkata (IN); Anindita Mondal, Hooghly (IN); Papiya Nandy, Kolkata (IN)

(73) Assignee: Jadavpur University (IN)

( * ) Notice: Subject to any disclaimer, the term of this patent is extended or adjusted under 35 U.S.C. 154(b) by 609 days.

(21) Appl. No.: 13/039,737

(22) Filed: Mar. 3, 2011

(65) Prior Publication Data
US 2012/0225332 A1 Sep. 6, 2012

(51) Int. Cl.
H01M 6/36 (2006.01)
H01M 8/18 (2006.01)
H01M 8/20 (2006.01)
C01B 13/36 (2006.01)
H01M 10/36 (2010.01)
H01M 12/08 (2006.01)

(52) U.S. Cl.
CPC ............ *H01M 8/182* (2013.01); *H01M 10/365* (2013.01); *H01M 12/085* (2013.01); *H01M 6/36* (2013.01); *Y10T 29/49108* (2015.01); *H01M 8/20* (2013.01); *Y02E 60/528* (2013.01); *C01B 13/366* (2013.01)

(58) Field of Classification Search
CPC .... H01M 6/36; H01M 10/365; H01M 12/085
USPC .......... 429/229, 231, 406, 498, 499, 500, 501
See application file for complete search history.

(56) References Cited

U.S. PATENT DOCUMENTS

| | | | | |
|---|---|---|---|---|
| 4,273,839 A | * | 6/1981 | Carr et al. | 429/51 |
| 2006/0003203 A1 | * | 1/2006 | Wang et al. | 429/21 |
| 2006/0154126 A1 | * | 7/2006 | Ritts et al. | 429/29 |
| 2009/0010608 A1 | * | 1/2009 | Buretea et al. | 385/144 |
| 2009/0071534 A1 | * | 3/2009 | Wang et al. | 136/255 |
| 2009/0159120 A1 | | 6/2009 | Wang et al. | |

OTHER PUBLICATIONS

Subramanyam et al. "Physical properties of zinc oxide films prepared by dc reactive magnetron sputtering at different sputtering pressures"; Crystal Research and Technology (2000), 35: 1193-1202 (Abstract).
Ozgur et al. "A comprehensive review of ZnO materials and devices"; Journal of Applied Physics (2005), 98: 041301-1-041301-50.
Yanhong et al. "A Study of Quantum Confinement Properties of Photogenerated Charges in ZnO Nanoparticles by Surface Photovoltage Spectroscopy"; J. Phys. Chem (2004), 108: 3202-3206.

(Continued)

*Primary Examiner* — Jeremiah Smith
(74) *Attorney, Agent, or Firm* — Steven S. Rubin, Esq.; Moritt Hock & Hamroff LLP

(57) ABSTRACT

Technologies are generally described for methods and systems for implementing a thermal electrochemical cell. Some example electrochemical cells described herein may comprise a first container including a first electrode and an electrolyte effective to receive electrons from the first electrode. Some electrochemical cells may further comprise a second container including a second electrode and an aqueous suspension including zinc oxide nanoparticles. Some electrochemical cells may also further comprise a contact member in between the first container and the second container.

11 Claims, 4 Drawing Sheets

(56) References Cited

OTHER PUBLICATIONS

White "Production and Analysis of Conjugate Polymer/ZnO Solar Cells"; NNIN REU Research Accomplishments (2005), p. 156-157.
Guenther KH "Physical and chemical aspects in the application of thin films on solgel template process"; Applied optics (1984), 23: 3612-3632.
Wu et al. "Controlled synthesis of ZnO nanowires or nanotubes via sol-gel template process"; Solid State Communications 134 (2005) 485-489.
Lyu et al. "Low temperature growth and photoluminescence of well-aligned zinc oxide nanowires"; Chemical Physics Letters, 363: p. 134-138.
Banerjee et al. "Synthesis and Photoluminescence studies of ZnO nanowires"; Nanotechnology 15 (2004) 404-409.
Li et al. "Progress in semiconducting oxide based thin film transistors for displays"; Semiconductor science and technology (2005), 20(8): 720-725.
Guo et al. "Particle surface engineering effect on the mechanical, optical and photoluminescent properties of ZnO/vinyl ester resin nanocomposites"; Journal of Materials Chemistry (2007), 17: 806-813.
Hosono et al. "The fabrication of an upright standing zinc oxide nanosheet for use in dye-sensitized solar cells"; Adv. Mater 17 (2005): 2091-2094.
Yang et al. "Photoelectric response mechanisms dependent on RuN3 and CuPc sensitized ZnO nanoparticles to oxygen gas"; Nanotechnology (2006) 17: 4567-4571.
Kumar et al. "Ultrasensitive DNA sequence detection using nanoscale ZnO sensor arrays"; Nanotechnology (2006), 17: 2875-2881.
Xiong et al. "Stable Aquesous ZnO @ Polymer Coreshell Nanoparticles with Tunable Photoluminescence and their application in cell imaging"; Journal of the American Chemical Society (2008), 130: 7522-7523.
Ciamician "The photochemistry of the Future"; (1912), 1-12.
Mondal et al. "Heat induced voltage generation in electrochemical cell containing zinc oxide nanoparticles"; Energy 35 (2010) 2160-2163; Mar. 5, 2010.
Shin et al. "Enhancement of photovoltaic properties of Ti-modified nanocrystalline Zno electrode for dye-sensitized solar cell"; Bulletin of the Korean Chemical Society (2005), 26(12): 1929-1930.
Wei et al. "A Solid-state dye-sensitized solar cell based on a novel ionic liquid gel and ZnO nanoparticles on a flexible polymer substrate"; Nanotechnology (2008), 19(424006): 1-5.
O'Regan et al. "A low-cost, high-efficiency solar cell based on dye-sensitized colloidal TiO2 films"; Nature (London) (1991), 353: p. 737-739.
Redmond et al. "Visible light sensitization by cis-bis (thiocyanato)bis(2,2-bipyridyl-4,4'-dicarbosylato) ruthenium (II) of a transparent nanocrystalline ZnO film prepared by sol-gel techniques"; Chemistry of Materials (1994), 6: 686-691.
Suliman et al. "Preparation of ZnO nanoparticles and nanosheets and their application to dye-sensitized solar cells"; Solar Energy Materials and Solar Cells (2007), 91: 1658-1662.
Mondal et al. "Increased quantum efficiency in hybrid photoelectrochemical cell consisting of thionine and zinc oxide nanoparticles"; J. Photochem. Photobiol. A. (2010), 211: 143-146.
Beek et al. "Hybrid polymer cells based on zinc oxide"; J. Mater. Chem. (2005), 15: 2985-2988.
Beek et al. "Efficient Hybrid Solar Cells from Zinc Oxide Nanoparticles and a Conjugated Polymer"; Adv. Mater. 2004, 16, No. 12, Jun. 17.
Li et al. "UV photocoltaic cells based on conjugated ZnO quantum dot/multiwalled carbon nanotube heterostructures"; Applied Physics Letters, 94, 111906 (2009); http://dx.doi.org/10.1063/1.3098400 (3 pages).
Verma et al. "Synthesis and photosuminescence of ZnO nanophosphors"; Proc. of ASID (2006), 256-258.
"Quantum Dot"; en.wikipedia.org/wiki/Quantum_dot, retrieved from Wikipedia.org on Nov. 19, 2010.

* cited by examiner

200

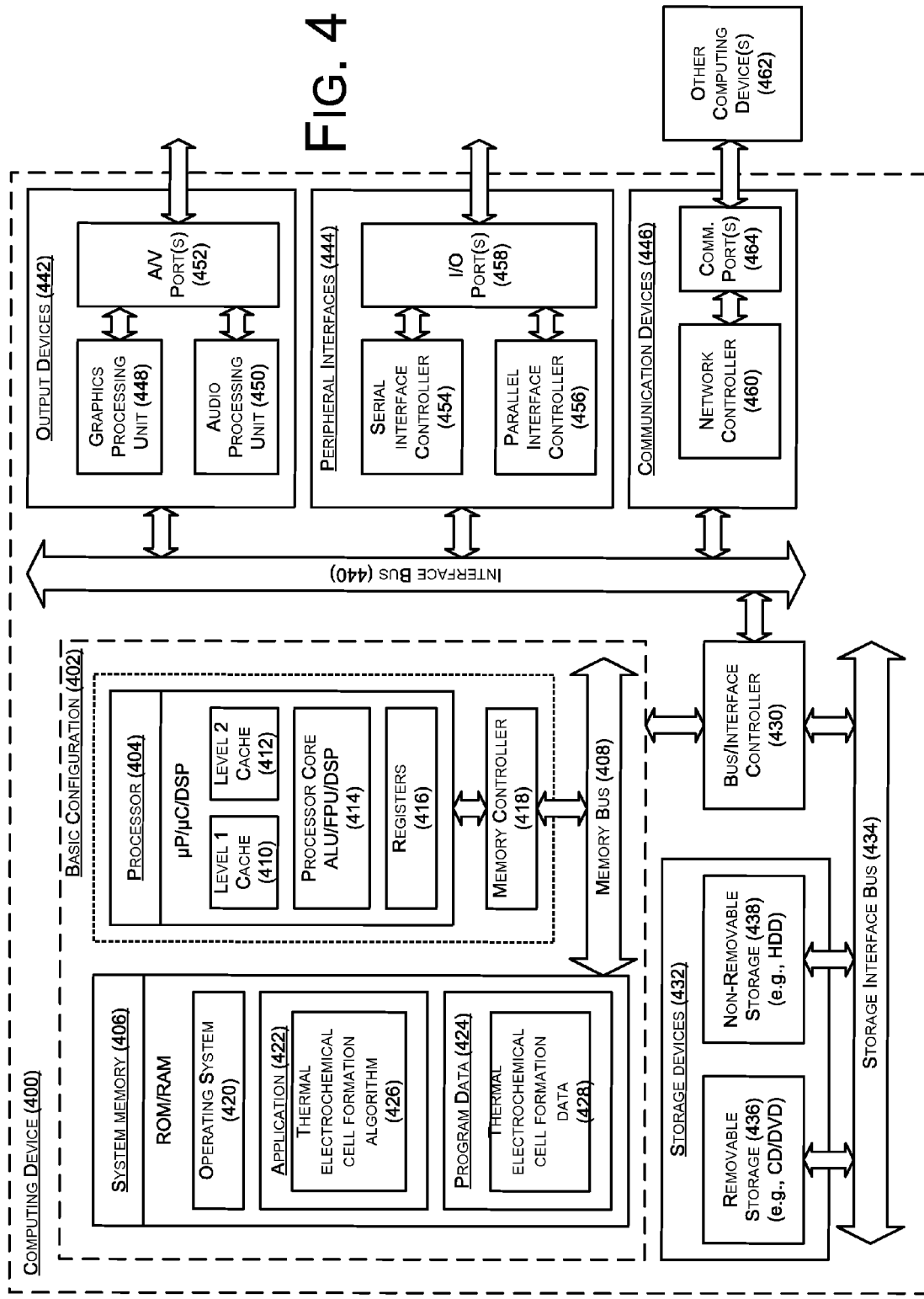

THERMAL ELECTROCHEMICAL CELL

BACKGROUND

Unless otherwise indicated herein, the materials described in this section are not prior art to the claims in this application and are not admitted to be prior art by inclusion in this section.

A battery may be able to generate a voltage potential from a chemical reaction. A battery may include a first half cell and a second half cell separated by an ionic contact member. The first half cell may include a first electrolyte material and a first electrode. The first electrolyte material may be effective to oxidize or give up electrons to the electrode. The second half cell may include a second electrolyte material and a second electrode. The second electrolyte material may be effective to reduce or receive electrons from the second electrode.

SUMMARY

In some examples, an electrochemical cell is generally described. The electrochemical cell may include a first container, a second container and a contact member. The first container may include a first electrode and an electrolyte. The electrolyte may be effective to receive electrons from the first electrode. The second container may include a second electrode and an aqueous suspension including zinc oxide nanoparticles. The contact member may be in between the first container and the second container.

In some examples, a method for forming an electrochemical cell is generally described. The method may include placing an electrolyte in a first container, the first container including a first electrode, the electrolyte effective to receive electrons from the first electrode. The method may include placing an aqueous suspension including zinc oxide nanoparticles in a second container. The method may include placing a contact member in between the first container and the second container.

In some examples, a method for sending a current through a load is generally described. In some examples, the method may include placing an electrochemical cell at a location with respect to a heat source such that the electrochemical cell is effective to receive heat from the heat source. The electrochemical cell may include a first container including a first electrode, a first lead in contact with the first electrode, and an electrolyte effective to receive electrons from the first electrode. The electrochemical cell may include a second container including a second electrode, a second lead in contact with the second electrode, and an aqueous suspension including zinc oxide nanoparticles. The electrochemical cell may include a contact member in between the first container and the second container. The method may include placing the load between the first lead and the second lead.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a block diagram illustrating an example computing device that is arranged to implement a thermal electrochemical cell;

Figure 1:
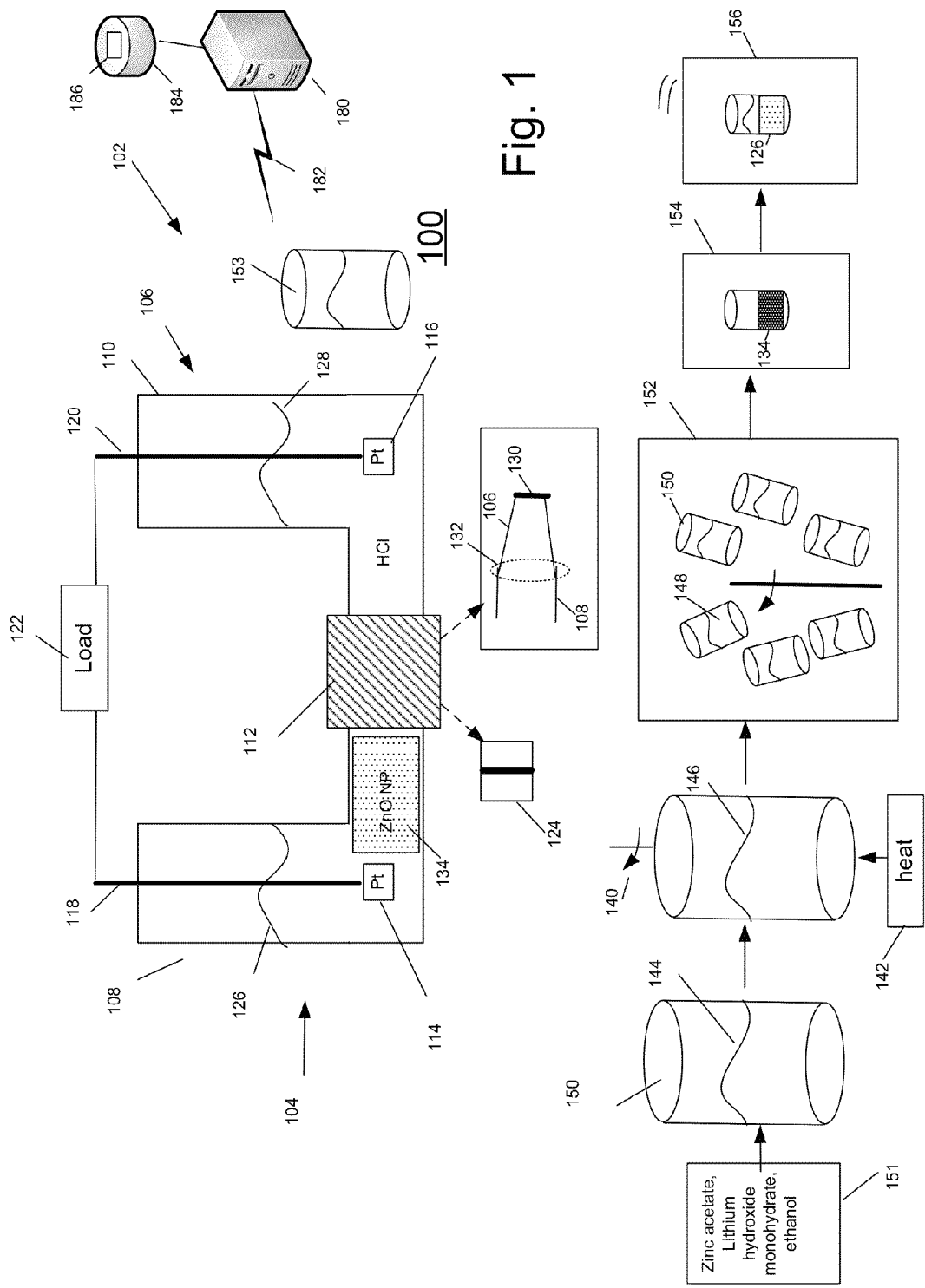
FIG. 1 illustrates an example system that can be utilized to implement a thermal electrochemical cell.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to a thermal electrochemical cell.

Briefly stated, technologies are generally described for methods and systems for implementing a thermal electrochemical cell. Some example electrochemical cells described herein may comprise a first container including a first electrode and an electrolyte effective to receive electrons from the first electrode. Some electrochemical cells may further comprise a second container including a second electrode and an aqueous suspension including zinc oxide nanoparticles. Some electrochemical cells may also further comprise a contact member in between the first container and the second container.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement a thermal electrochemical cell that is arranged in accordance with at least some embodiments described herein. A thermal electrochemical cell system 100 may include a thermal electrochemical cell 102. Thermal electrochemical cell 102 may include a first container 104 and a second container 106. An ionic contact connector 112 may be placed between first container 104 and second container 106. In some examples, first container 104 may include an L-shaped glass tube 108. In some examples, second container 106 may include an L-shaped glass tube 110. Tube 108 may include an aqueous suspension 126 including zinc oxide nanoparticles 134, an electrode 114 and/or a lead 118. Tube 110 may include an electrolyte such as an HCl (hydrochloric acid) solution 128, an electrode 116 and/or a lead 120. HCl solution 128 may come from a source 153. A load 122 may be placed between leads 118 and 120 such that a generated current may be sent through the load. In an example, electrodes 114, 116 may include platinum, stainless steel, or gold. In an example, HCl solution 128 may have a concentration of about 0.1 M.

At least some of these elements may be arranged in communication with a processor 180 through a communication link 182. In some examples, processor 180 may be adapted in communication with a memory 184 that may include instructions 186 stored therein. Processor 180 may be configured, such as by instructions 186, to control at least some of the operations/actions/functions described below.

An example ionic contact connector 112 may include a platinum foil or relatively thin platinum sheet 124. In an example, foil 124 may be about 0.6 cm× about 0.4 cm and about 0.1 cm thick. In another example, ionic contact connector 112 may include a joint 132 effective to couple first container 108 with second container 110. Ionic contact connector 112 may also include a membrane 130. Membrane 130 may be a micro-pore filter, such as a planar lipid membrane, with a porosity of about 10 μm. The planar lipid membrane may include a hydrophobic barrier effective to hinder back recombination of charges produced by thermal excitation as discussed herein. In some examples, oxidized Cholesterol may be dissolved in n-decane to form membrane 130. In an example, a saturated solution of oxidized cholesterol may be brushed on an end of container 108 or container 110 to form membrane 130. Container 110 may be a sintered glass disc.

In some examples, zinc oxide nanoparticles 134 in aqueous suspension 126, may be a particle of any shape, including but not limited to, spheroid, oblong, polygonal, and globular structure and have all three physical dimensions within the range of about 1 nm to about 100 nm. In some examples, fluid in aqueous suspension 126 may be an aqueous solution, including but not limited to acidic or basic media or an organic solvent or media. Particles other than zinc oxide nanoparticles 134 may also be suspended in aqueous suspension 126.

In some examples, aqueous suspension 126, including zinc oxide nanoparticles 134, may be formed using the following method. Zinc acetate dihydrate $Zn(OAc)_2 \cdot 2H_2O$ and lithium hydroxide monohydrate $LiOH \cdot H_2O$ may be provide from a source 151 and mixed in ethanol in a container 150 at a pressure of approximately one atmosphere to produce a mixture 144. In an example, 0.275 g of zinc acetate, 0.073 g of lithium hydroxide and 12.5 ml of ethanol was used. A stirring device 140 may be adapted to mix or stir mixture 144 for about 30 minutes and a heat source 142 may be adapted (e.g., via control from processor 180) to heat mixture 144 to about 60 degrees Celsius to produce a mixture 146. In an example, stirring device 140 may be adapted to stir mixture 144 while heat source 142 raises a temperature of mixture 144 up to 60 degrees Celsius. In some examples, mixture 146 may include a clear solution and a white precipitate.

A centrifuge 152 may be configured (e.g., via control from processor 180) to spin container 150 including mixture 146 at about 15,000 revolutions per minute to produce a precipitate 148. An oven 154 may be configured to dry precipitate 148 at a temperature of about 70 degrees Celsius, to produce solid zinc oxide nanoparticles 134. In an example, the zinc oxide nanoparticles may be in a range of about 7 nm to about 10 nm. An ultrasonic bath 156 may be adapted (e.g., via control from processor 180) to sonicate solid zinc oxide nanoparticles 134 with water to produce aqueous suspension 126. In an example, 1 ml of water may be sonicated with 10 μg of solid zinc oxide nanoparticles 134 for about 20 minutes. Aqueous suspension 126 may then be placed in first container 108.

In one example, heat was applied to cell 102. For example, cell 102 may be placed at a location with respect to a heat source such that cell 102 may be effective to receive heat from the heat source. Zinc oxide nanoparticles 134 were effective to receive energy from the heat and produce electrons or excitons. These electrons created a potential difference between aqueous suspension 126 including zinc oxide nanoparticles 134 and the HCl solution 128. In an example, cell 102 may be effective to generate about 268 mV with an applied heat of about 30 degrees Celsius. In another example, cell 102 may be effective to generate about 498.5 mV with an applied heat of about 50 degrees Celsius and a 1.05% energy conversion efficiency. In an example, the energy conversion efficiency may be calculated as the ratio of input energy to output energy. For example, energy conversion efficiency may be equal to the voltage between leads 118, 120 with no load, multiplied by a current through a short circuit between leads 118, 120, and divided by input heat energy. In an example, system 100 may used to store voltage for 60 hours.

Among other benefits, a system arranged in accordance with the present disclosure may be used to generate a voltage from incident heat. Heat energy may be used from the sun even on a cloudy day where a photovoltaic cell may be less effective. Moreover, other sources of heat may be used to generate a voltage. For example, heat energy in solar climates may be sufficient to generate energy in a cell. Thermal energy that may be otherwise wasted in mechanical work may be used and converted into a voltage.

Figure 2:
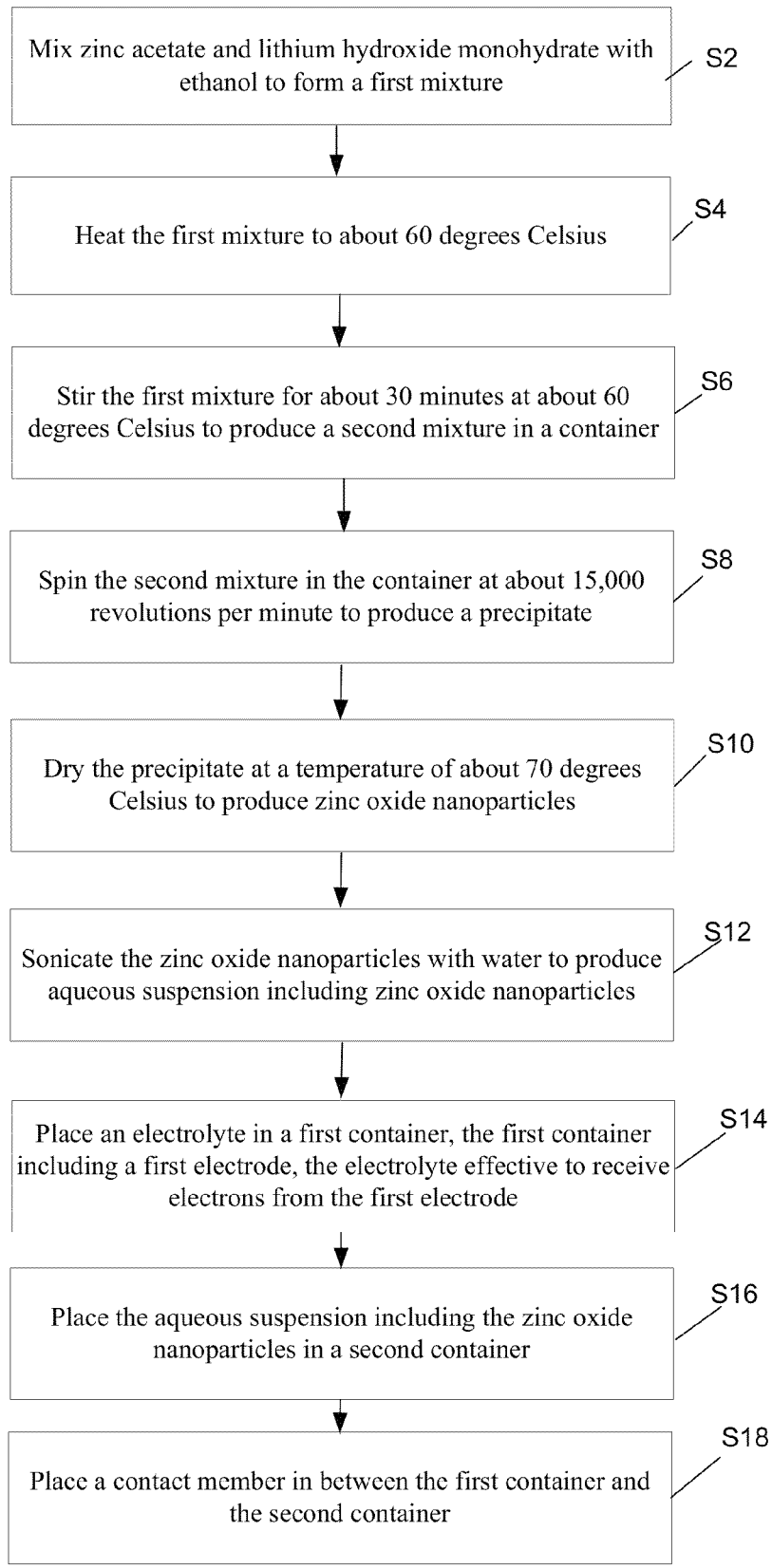
FIG. 2 depicts a flow diagram for an example process for implementing a thermal electrochemical cell.

FIG. 2 depicts a flow diagram for an example process 200 for implementing an electrochemical cell arranged in accordance with at least some embodiments described herein. The process in FIG. 2 could be implemented using, for example, system 100 discussed above. An example process may include one or more operations, actions, or functions as illustrated by one or more of blocks S2, S4, S6, S8, S10, S12, S14, S16 and/or S18. Although illustrated as discrete blocks, various blocks may be divided into additional blocks, combined into fewer blocks, or eliminated, depending on the desired implementation.

Process 200 may begin at block S2, "Mix zinc acetate and lithium hydroxide monohydrate with ethanol to form a first mixture". In some examples, a processor may be configured to control a mixer to mix zinc acetate and lithium hydroxide monohydrate with ethanol to form a first mixture.

Processing may continue from block S2 to block S4, "Heat the first mixture to about 60 degrees Celsius". In some examples, the processor may be configured to control a heat source such that the heat source is effective to heat the first mixture to about 60 degrees Celsius. For example, the heat source may be arranged to heat a container including the first mixture. The heat source may be arranged to heat the first mixture through one or more of conduction, convection, and/or radiation.

Processing may continue from block S4 to block S6, "Stir the first mixture for about 30 minutes at about 60 degrees Celsius to produce a second mixture in a container". In some examples, the processor may be configured to control a stirring device such that the stirring device is configured to effectively stir the mixture for about 30 minutes, while heated up to 60 degrees Celsius, to produce a second mixture.

Processing may continue from block S6 to block S8, "Spin the second mixture in the container at about 15,000 revolutions per minute to produce a precipitate". In some examples, the processor may be configured to control a centrifuge such that the centrifuge spins the container at a rate of about 15,000 revolutions per minute to produce a precipitate.

Processing may continue from block S8 to block S10, "Dry the precipitate at a temperature of about 70 degrees Celsius to produce zinc oxide nanoparticles". In some examples, the processor may be configured to control an oven such that the oven is effective to dry the precipitate to produce zinc oxide nanoparticles.

Processing may continue from block S10 to block S12, "Sonicate the zinc oxide nanoparticles with water to produce aqueous suspension including zinc oxide nanoparticles". In some examples, the processor may be configured to control an ultrasonic bath such that the ultrasonic bath is effective to sonicate the nanoparticles with water to produce an aqueous suspension including zinc oxide nanoparticles.

Processing may continue from block S12 to block S14, "Place an electrolyte in a first container, the first container including a first electrode, the electrolyte effective to receive electrons from the first electrode". In some examples, the processor may be configured to control a source of an electrolyte such that the source is effective to place the electrolyte in a first container. The first container may include a first electrode.

Processing may continue from block S14 to block S16, "Place the aqueous suspension including the zinc oxide nanoparticles in a second container". In some examples, the processor may be configured to control the ultrasonic bath such that the ultrasonic bath is effective to place the aqueous suspension including zinc oxide nanoparticles into a second container.

Processing may continue from block S16 to block S18, "Place a contact member in between the first container and the second container". In some examples, a contact member may be placed in between the first container and the second container such as by hand or by machine. As a result of process 200, a thermal electrochemical cell may be formed.

Figure 3:
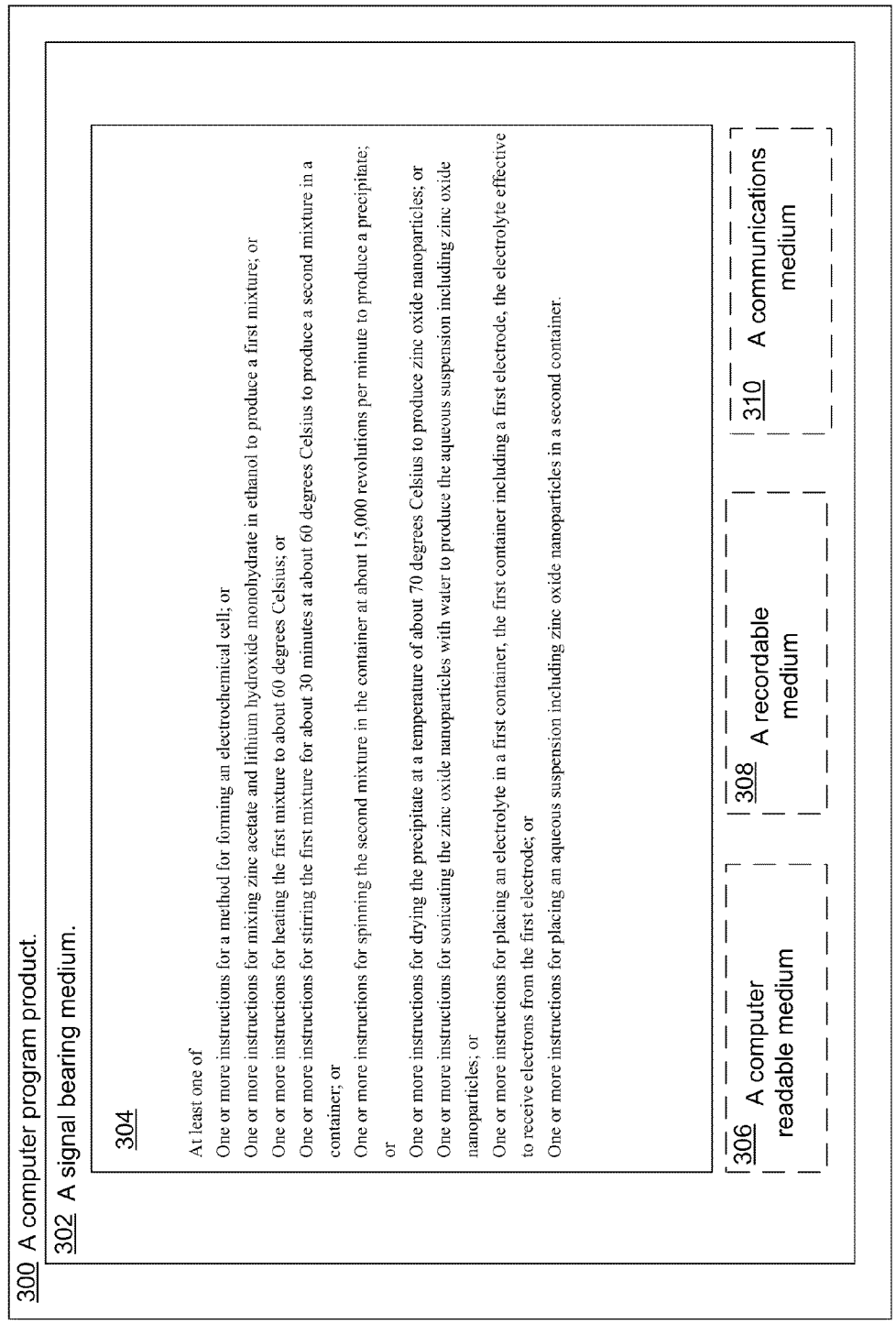
FIG. 3 illustrates a computer program product that can be utilized to implement a thermal electrochemical cell.

FIG. 3 illustrates a computer program product that can be utilized to implement a thermal electrochemical cell arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, processor 180 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device that is arranged to implement a thermal electrochemical cell arranged according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a thermal electrochemical cell formation algorithm 426 that is arranged to perform one or more of the functions, actions or operations as described herein including those described with respect to one or more of FIGS. 1-3. Program data 424 may include thermal electrochemical cell formation data 428 that may be useful for thermal electrochemical cell formation as is described herein, hi some embodiments, application 422 may be arranged to operate with program data 424 on operating system 420 such that thermal electrochemical cell formation may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least" the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electrochemical cell comprising:
   a first container including a first electrode positioned within a liquid electrolyte, the electrolyte effective to receive electrons from the first electrode;
   a second container including a second electrode positioned within an aqueous suspension including zinc oxide particles, wherein the included zinc oxide particles consist of uncoated zinc oxide nanoparticles; and
   a contact member in between the first container and the second container, the contact member ionically coupling the first and second containers.

2. The electrochemical cell as recited in claim 1, further comprising:
   a first lead touching the first electrode; and
   a second lead touching the second electrode.

3. The electrochemical cell as recited in claim 1, wherein the electrolyte includes an HCl solution.

4. The electrochemical cell as recited in claim 1, wherein the contact member includes a platinum foil.

5. The electrochemical cell as recited in claim 1, wherein the contact member includes a lipid membrane.

6. The electrochemical cell as recited in claim 1, wherein the contact member includes:
   a joint between the first container and the second container; and
   a planar lipid membrane.

7. The electrochemical cell as recited in claim 1, wherein the contact member includes:
   a joint between the first container and the second container; and
   a planar cholesterol membrane.

8. The electrochemical cell as recited in claim 1, wherein the contact member includes a hydrophobic barrier.

9. The electrochemical cell as recited in claim 1, wherein the first and second electrodes include platinum, stainless steel or gold.

10. The electrochemical cell of claim 1, wherein the electrochemical cell is a thermal electrochemical cell configured to produce an output voltage in response to received heat.

11. An electrochemical cell comprising:
    a first container including a first electrode positioned within a liquid electrolyte, the electrolyte effective to receive electrons from the first electrode;
    a second container including a second electrode positioned within an aqueous suspension including zinc oxide particles, wherein the included zinc oxide particles consist of uncoated zinc oxide nanoparticles; and
    a contact member in between the first container and the second container, the contact member ionically coupling the first and second containers, wherein the electrochemical cell is a thermal electrochemical cell configured to produce an output voltage in response to received heat.

* * * * *

UNITED STATES PATENT AND TRADEMARK OFFICE
CERTIFICATE OF CORRECTION

| | | |
|---|---|---|
| PATENT NO. | : 9,070,936 B2 | Page 1 of 1 |
| APPLICATION NO. | : 13/039737 | |
| DATED | : June 30, 2015 | |
| INVENTOR(S) | : Das et al. | |

It is certified that error appears in the above-identified patent and that said Letters Patent is hereby corrected as shown below:

In the Specification

In Column 8, Line 4, delete "least"" and insert -- least," --, therefor.

Signed and Sealed this
Seventeenth Day of November, 2015

Michelle K. Lee
*Director of the United States Patent and Trademark Office*